Sept. 5, 1933.  A. E. SPINASSE  1,925,414

APPARATUS AND METHOD FOR DRAWING GLASS

Filed July 6, 1927  2 Sheets-Sheet 1

Inventor

Arthur E. Spinasse

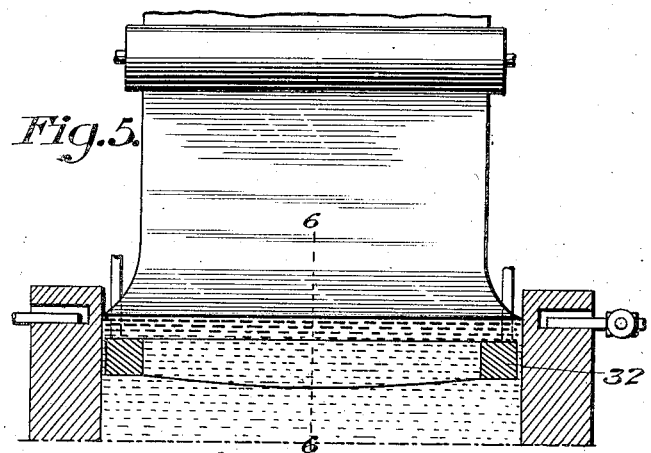
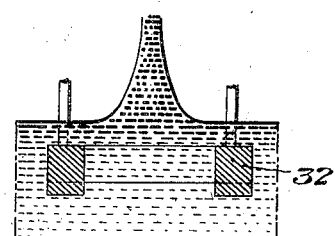
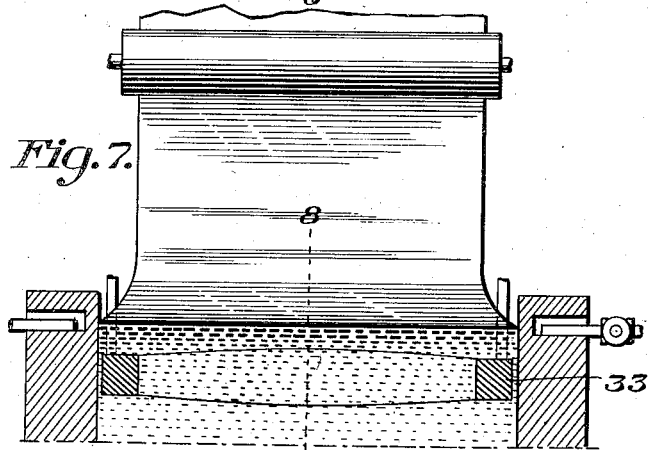
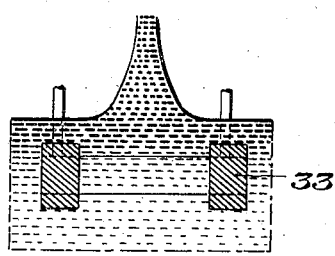
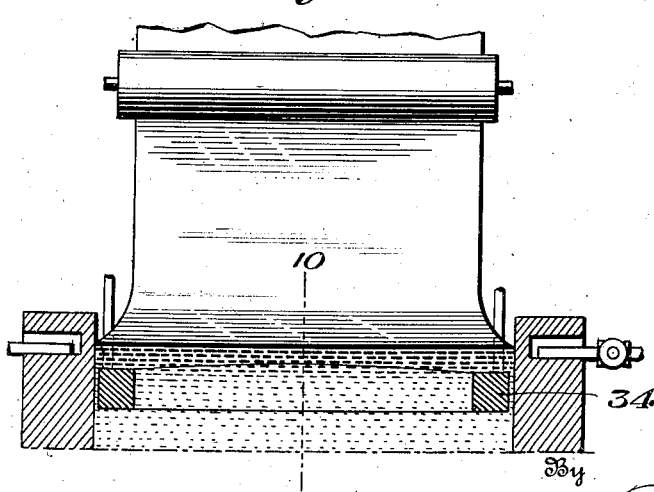
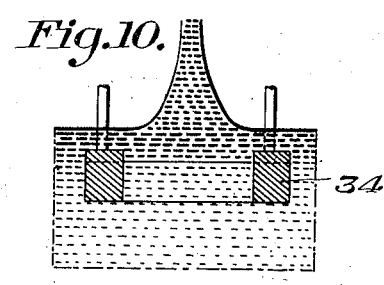

Patented Sept. 5, 1933

1,925,414

UNITED STATES PATENT OFFICE 1,925,414

APPARATUS AND METHOD FOR DRAWING GLASS

Arthur E. Spinasse, Mount Vernon, Ohio

Application July 6, 1927. Serial No. 203,837

13 Claims. (Cl. 49—17)

The present invention relates to improvements in the art of drawing continuous sheet glass from a bath of molten glass, and has for its primary object the arrangement of parts to prevent the crystallization of glass at the surface of the bath in proximity to the source of the sheet or plate glass being drawn. Also the invention has for an object the improvement of means and method for supplying a cooled portion of anchored glass of substantially uniform viscosity throughout from which a flat sheet of glass may be drawn freer or devoid of wavy defects, lines or similar blemishes.

The above and various other objects and advantages of this invention will be described in and understood from the following detailed description of the present preferred embodiments thereof and the improved method or process of practicing the invention, the embodiments being illustrated in the accompanying drawings, wherein:—

Figure 5 is a transverse section similar to Figure 1, but showing a modified form of ring.

Figure 6 is a transverse section taken on the line 6—6 of Figure 5.

Figure 7 is a transverse section similar to Figure 5 showing another modified form of the ring.

Figure 8 is a transverse section in the line 8—8 thereof.

Figure 9 is a transverse section similar to Figure 5, but showing a further modified form of ring, and Figure 10 is a transverse section taken on the line 10—10 of Figure 9.

Figure 1:
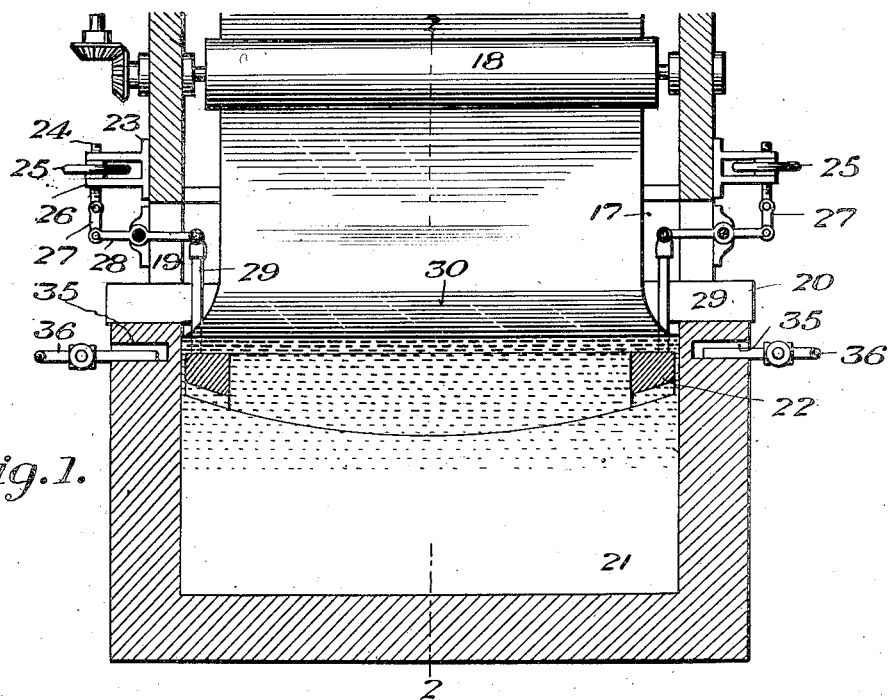
Figure 1 is a transverse section taken through a forehearth of a glass furnace at the line of the draw, showing the improvement of this invention mounted therein and in relation to a sheet of glass being drawn.
Figure 3:
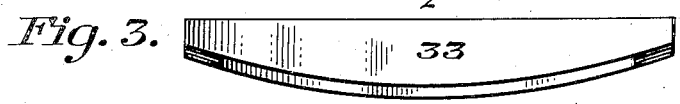
Figure 3 is a detail front edge view of the cooling and anchoring ring employed.

Referring to the drawings, and first to Figures 1 to 4, 15 designates a melting tank in which the glass is melted in the usual manner. The front of the melting tank is in communication with the forehearth 16, the roof of which has an elongated drawing opening 17 transversely of the forehearth 16, and above which is disposed the sheet drawing means 18 within the leer 19. A pair of shields 20 is disposed at the opposite sides of the opening 17, the shields 20 approaching but spaced above the normal surface level of the bath 21.

Figure 2:
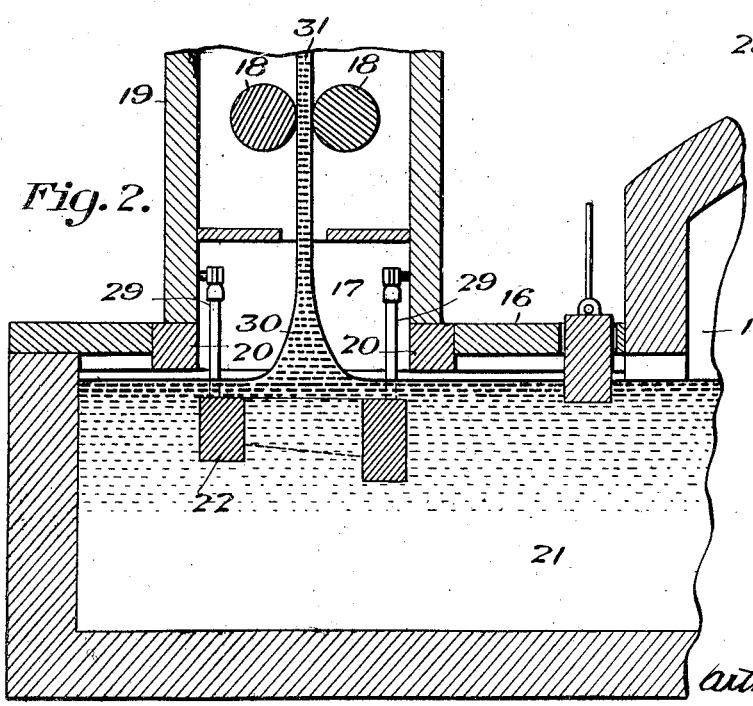
Figure 2 is a longitudinal section taken substantially on the line 2—2 of Figure 1, and showing the melting tank in communication with the drawing forehearth.

Located in the bath 21 is an oblong or rectangular ring 22 having a longitudinal opening throughout the length thereof, the same adapted to be disposed in register with and beneath the opening 17 and extending lengthwise thereof. The ring 22 is maintained in a totally submerged position in the bath 21 by any suitable means, such as the means illustrated. In Figures 1 and 2 the end walls of the leer 19 are utilized for supporting each bracket 23, and each bracket 23 has mounted therein a vertically slidable shaft 24 upon which is threaded a hand wheel 25 held against vertical movement by arms 26 of the bracket. The shaft 24 is connected by a pivoted link 27 to an arm 28 pivoted in the lower end of the bracket 23 and projecting through the walls of the leer 19. Pivotally suspended upon the inner end of the arm 28 is a refractory rod 29 adapted at its lower end to bear against the upper surface of the submerged ring 22.

The ring adjusting devices may be disposed not only at each end of the ring but also at opposite corners thereof, so that the ring may be adjusted to any desired position or depth entirely submerged beneath the surface level of the bath. This adjustment of the ring 22 permits the desired free surface layer flow of the molten glass from the forehearth 16 over the upper surface of the ring 22 and beneath the shields 20 to the source or meniscus 30 of the sheet of glass 31 being drawn; thereby minimizing the tendency to the divitrification of the glass at the drawing area.

Figure 4:
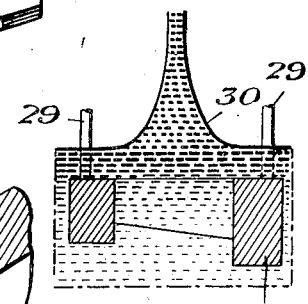
Figure 4 is a fragmentary sectional view of Figure 2, showing the ring in a different adjustment.

The ring 22 is submerged to a greater or less extent in the bath to regulate the gather of the meniscus of the sheet. The ring 22 is positioned to form a relatively shallow layer of cooler glass above the upper surface of the ring adjacent the meniscus. If the relatively thin layer produces imperfections in the drawn sheet, the ring 22 may be further submerged as shown in Figure 4. In this latter case the surface layer is increased in thickness and has less surface tension, and also regulate the amount of glass passing through the ring. Either of the spaced parallel walls of the ring may be submerged to desired independent degree or depth to increase or decrease the surface tension at either side of the base of the sheet to thereby regulate the position of the meniscus between the submerged walls of the ring.

The rear wall of the ring 22, or the wall adjacent the hot tank is of greater depth or vertical height than the front wall of the ring. Both the front and rear walls of the ring 22 are of greater vertical area or height at their intermediate portions in the hotter portion of the bath than at their ends where the bath is not so hot. In the form shown in Figures 1 to 4 this is accomplished by providing the front and rear wall of the ring 22 with lower convexed faces, and the curvature of these faces preferably extends from end to end of the walls so as to gradually increase their depths from the ends to their intermediate portions and graduate the cooling effect in proportion to the varying degree of heat of the bath from the sides to the middle portions of the drawing chamber. As shown in Figure 1, I may provide a restricted channel 35 in the wall of the tank with cooling pipe 36 for regulating the surface temperature of the wall of the tank at the source of the drawn sheet edges to counteract the narrowing tendency of the sheet.

In the form of ring 32 shown in Figures 5 and 6, the lower faces of the front and rear walls of the ring are of uniform vertical thickness and of convex contour.

In Figures 7 and 8, the ring 33 has its front and rear walls gradually increasing in depth from their ends to their intermediate portions by the convex formation of both the upper or lower faces of the walls, and the curvature may extend throughout the length of the walls.

In Figures 9 and 10, the ring 34 may be provided at its front and rear walls with convex upper faces only to gradually increase the vertical height from the ends to the intermediate portions of the walls. This increases the force of anchorage to the glass at the source of the sheet, gradually and uniformly from the edges to the intermediate portion of the sheet. It also decreases the depth of the cooler layer of glass above the ring beneath the meniscus, gradually and uniformly from the edges to the intermediate portion of the sheet, thereby obtaining a sheet with walls of greater uniform thickness throughout. The rings, in all forms, are preferably of such width between their front and rear walls that the inner opposite faces of the walls substantially aline in spaced relation with the outer edges of the base of the meniscus of the drawn sheet. These inner faces of the walls are preferably vertical and substantially parallel to each other throughout the length of the ring.

In the figures the edges of the sheet are shown as being drawn from the layer of glass lying above the end portions of the submerged ring, but it will be understood also that the sheet may be drawn with its edges generating from the glass lying directly above the opening in the ring or at any point in line therewith above the ring so as to obtain the benefit of the relatively deep hot portion of the glass; in this case, I prefer to rely upon the restricted anchorages formed by the means arranged within the walls of the tank in the same plane as the sheet, to both counteract the narrowing tendency of the sheet and regulate the thickness of the glass being drawn in the edges of the sheet.

In the case of Figures 7 to 10, the segregated top layer of the glass which lies directly below the meniscus, is of greater depth beneath the generating edges of the sheet than in the middle portion thereof and precludes or minimizes the formation of undue cooler areas of glass adjacent to such edges. The glass may thus be nicely regulated as to temperature and viscosity by increasing or decreasing the degree of the curves in the upper convex surfaces of the ring as well as by regulating the depth of submergence of the ring and the sizes of the spaces between the parallel walls of the ring and sides of the meniscus.

In Figures 5 to 10, the front and rear walls of the anchoring and segregating ring are shown as of similar or like dimensions as to depth or height, thickness or the like but it is understood that these walls may vary from one another such as is shown in Figures 1 to 4.

As clearly shown in the figures, the sheet glass is drawn from the free surface of the glass and out of shaping contact with refractory bodies, and from a substantially constant or uniform surface level of the glass bath.

In practicing the process or method of this invention the oblong ring of refractory clay, is placed in the bath and completely submerged so that the opposite walls thereof lie spaced parallel to each other within the bath co-extensive with and slightly outside the opposite lines of the base of the meniscus which is thus drawn from a deep body portion of the bath. The rear and front walls of the ring, being made of solid refractory material, provide mild cooling elements which are, however, sufficiently hot to adhere to the glass. These elements act as anchorages to control the position of the sides of the meniscus in proximity to but beneath the surface level of the bath. The front and rear walls of the ring by their peculiar construction as above described, vary the effective cooling of the molten glass as it passes through and over the ring, such effect being accomplished by the peculiar position of the ring as above fully set forth.

It is obvious that various changes and modifications may be made in the details of construction and design of the above specifically described embodiment of this invention without departing from the spirit thereof, such changes and modifications being restricted only by the scope of the following claims:—

What is claimed is:—

1. In apparatus for drawing sheet glass from a bath of molten glass at a predetermined level, a receptacle adapted to contain a bath of molten glass, means for drawing a sheet upwardly from the free open surface of the bath, a long narrow refractory clay anchoring ring adapted to lie placed in the bath, means for adjustably holding the ring completely submerged beneath the surface level of the bath in line with the sides and below the meniscus of the drawn sheet to provide a substantially free and unobstructed surface flow of the glass bath over the ring to the source of the drawn sheet, said ring having inner opposite side walls extending substantially parallel from top to bottom and throughout the length of the ring and spaced apart a distance not less than the width of the base of the meniscus of the drawn sheet, the ends of said ring being spaced apart a distance equal substantially to the width of the drawn sheet and said side walls each having their upper faces longitudinally convex from end to end.

2. In apparatus for drawing sheet glass, a receptacle for containing a bath of molten glass at a predetermined level, means for drawing the sheet from the free open surface of the bath, a refractory clay ring of oblong configuration, mean for holding said ring entirely submerged slightly beneath the surface of the bath so as to be covered with a layer of glass in line with the base of the meniscus of the sheet glass being drawn throughout the width thereof, the walls of said ring between the ends thereof being spaced apart substantially parallel to each other and the upper and lower faces of said ring being longitudinally convex horizontally from end to end.

3. In apparatus for drawing sheet glass, a receptacle for containing a bath of molten glass at a predetermined level, means for drawing the sheet from the free open surface of the bath, a refractory clay ring of oblong configuration, means for holding said ring entirely submerged slightly beneath the surface of the bath so as to be covered with a layer of glass and in line with the base of the meniscus of the sheet glass being drawn throughout the width thereof, said ring having opposite side walls with upper and lower faces, at least both of either the upper or lower faces of said walls being longitudinally convexly curved from end to end.

4. In combination with apparatus for drawing sheet glass, at a predetermined level, a receptacle for containing a bath of molten glass arranged to expose transversely of the receptacle and area of the bath for drawing, shielding means for said area, means for holding said shielding means above the surface of the bath, means for drawing the sheet from said area between said shielding means, a refractory clay ring of oblong configuration, means for maintaining said ring completely submerged beneath the surface of the bath to leave the surface of the bath free and unobstructed beneath and between said shielding means, the submerged means and the maniscus forming the sheet, the opposite walls of the ring being substantially parallel to each other throughout the length of the ring and co-extensive with the meniscus of the sheet, and the horizontally extending surfaces of both of said walls being convex from end to end.

5. In the process of drawing sheet glass from a bath of molten glass, anchoring the base of the sheet glass being drawn by completely submerging within the bath and at spaced wholly externally the opposite sides of the base meniscus of the sheet glass being drawn, a pair of spaced refractory clay cooling elements and gradually and uniformly increasing the cooling of the glass vertically within the bath from the edges to the intermediate portion of the sheet.

6. The process of drawing sheet glass from a bath of molten glass, which consists in surrounding and anchoring a portion of the glass by completely submerging in the bath and along the opposite sides of the base of the meniscus of the sheet, spaced refractory clay elements and gradually and uniformly increasing the cooling of the glass vertically within the bath from the edges to the intermediate portion of the sheet, causing the glass of the bath to flow between said elements beneath the base of the sheet while maintaining a substantially free and unobstructed surface flow of the bath above said elements to the source of the sheet, and regulating the temperature of the glass at each side of the meniscus by the submergence of either refractory clay cooling elements within the bath transversely of the sheet.

7. In the art of drawing continuous sheet glass from a molten bath, the process which consists in segregating wholly from within the bath and beneath the surface level of the bath, layers of cooler glass of varying depth co-extensive and slightly remote from the sides of the base of the sheet, anchoring the edges of the forming sheet to counteract the narrowing tendency of the sheet, and drawing the sheet from the substantially free and unobstructed surface of the bath wholly directly above a deep body portion of the bath and between said cooler layers of glass of varying depth.

8. In apparatus for drawing sheet glass from a bath of molten glass at a predetermined level, a glass segregating and anchoring ring of general oblong configuration, means for maintaining said ring entirely submerged within the bath and with the upper portion thereof spaced beneath the surface level of the bath so as to leave a free surface layer of glass thereabove and thereabout, the opposite longitudinal walls of said ring being spaced substantially parallel to each other from end to end and being also bodily spaced from the sides of the base of the meniscus being drawn which forms the sheet, the lower faces of both of said walls projecting gradually and uniformly to a lesser depth in the bath from the central portion thereof to the end portions of the ring.

9. In apparatus for drawing sheet glass, a receptacle for containing an open bath of molten glass at a predetermined level, an anchoring device comprising a rectangular ring, means for maintaining said ring wholly submerged beneath the surface of the bath transversely of the receptacle and below the base of the meniscus forming the sheet, said ring being at least as long as the width of the sheet being drawn and having opposite inner side walls and upper faces, the inner side walls of said ring being spaced apart a distance sufficient so that they will extend outside the base of the meniscus but adjacent thereto substantially throughout their length, and the upper faces of said walls being longitudinally convex and curving gradually and uniformly from the middle towards the end portions thereof.

10. In apparatus for drawing sheet glass from an open bath of molten glass at a particular level, an anchoring refractory device of oblong configuration having spaced apart long side walls, means for holding said device with the upper surface thereof wholly submerged beneath the surface level of the bath in line with the base of the sheet glass being drawn, one of said long side walls projecting to a greater depth within the glass bath than the opposite side wall to thereby compensate for variation in temperature in the bath and maintain a free drawing surface for the sheet.

11. In combination with an apparatus for drawing sheet glass, a drawing chamber, a melting tank for supplying the drawing chamber with molten glass at a substantially constant particular level, means for drawing a sheet of glass from the free surface of the bath in said chamber transversely thereof, shielding means including means for supporting said shielding means wholly spaced above the bath on each side of the forming sheet adjacent to the drawing area, a refractory bar at each side of the base of the meniscus which forms the sheet and extending in substantially parallel relation transversely across the width of the sheet, and means for maintaining each of said bars bodily spaced outside the base of the forming sheet and wholly submerged in spaced relation beneath the surface of the glass bath, the upper surfaces of each of said bars being longitudinally convexly curved substantially from end to end.

12. Apparatus for drawing flat sheet glass or plate from the free surface of a deep bath of molten glass at a particular level, comprising an anchoring device including a pair of widely spaced apart long narrow refractory blocks, means for holding said blocks wholly submerged within the mass of molten glass with the upper surfaces thereof slightly spaced beneath the free surface of the molten glass, said blocks lying within the glass bodily spaced laterally from the base of the meniscus which forms the sheet one along each side of said base of the meniscus throughout the width of the sheet, whereby the cross sectional area of the molten glass which lies between said long narrow blocks will be greater than the maximum cross sectional area of the said base of the meniscus throughout the entire width of the sheet.

13. The process of drawing sheet glass from a deep large mass of molten glass by use of anchoring refractory elements, which process consists in drawing the sheet from the surface of the mass of molten glass while maintaining the surface of the glass free and unobstructed for a considerable distance at each side of the forming sheet and with the cross sectional area of the base of the meniscus which forms the sheet, between the edge portions thereof, wholly drawn from that portion of the glass which lies entirely above the deep mass of the molten glass, maintaining said anchoring elements wholly submerged within the mass of molten glass, one along each side of the forming sheet, and wholly spaced laterally from the base of the meniscus which forms the sheet substantially throughout the entire width of the sheet.

ARTHUR E. SPINASSE.